United States Patent Office 3,521,139
Patented July 21, 1970

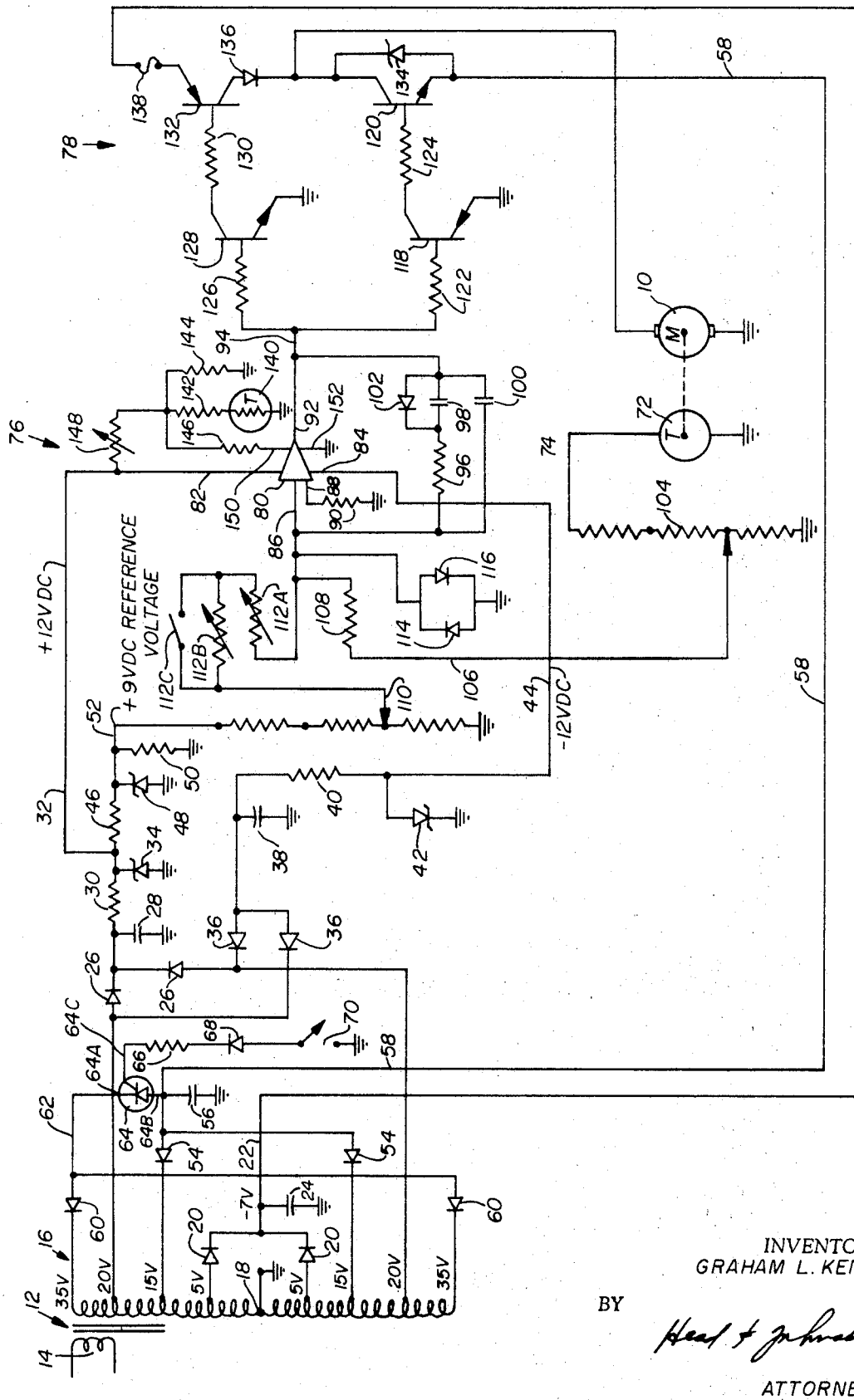

3,521,139
VELOCITY SERVO CIRCUIT
Graham L. Kendall, Tulsa, Okla., assignor to Midwestern Instruments, Inc., a division of Telex, Inc., Tulsa, Okla., a corporation of Delaware
Filed July 14, 1967, Ser. No. 653,477
Int. Cl. H02p 5/06
U.S. Cl. 318—302                      2 Claims

ABSTRACT OF THE DISCLOSURE

This invention relates to a variable speed velocity servo circuit. The invention is directed to a circuit for controlling the speed of a rotary driving device, such as a paper drive in an oscillograph, wherein improved and more accurate speed control is obtained. A direct current motor has connected to it a tachometer producing a voltage output proportional to the motor speed. An inverting D.C. operational amplifier is provided and a D.C. power amplifier, the output of the power amplifier being connected to provide D.C. power for operation of the motor. The output of the inverting operational amplifier drives the power amplifier. A selectable voltage means is provided producing a selectable reference voltage output, such selectable voltage means serving as a speed selector means. The reference voltage output is connected to the operational amplifier input and the output of the tachometer is also connected to the operational amplifier input so that the voltage applied to the operational amplifier is a function of the combined selected reference voltage and the tachometer output voltage. A negative feed back circuit from the operational amplifier output to the operational amplifier input eliminates oscillations which tend to be set up in the amplifying circuit. In the preferred embodiment the power amplifier includes a reverse drive amplifier means and a forward drive amplifier means in series, each of the amplifier means being fed by the operational amplifier output whereby when the speed control is changed from a high to low speed, a reverse drive voltage is supplied to the motor causing rapid deceleration to the newly selected speed. In addition, the preferred embodiment includes an improved power supply including means of selecting either a high or a low voltage output whereby the speed range of the motor is doubled.

SUMMARY

This inevntion will be described as it relates specifically to the control of a paper drive in an oscillograph. Basically an oscillograph is a device which provides visual reproductions of wave forms traced by lines of light on a strip of moving paper. In some applications an oscillograph is required to record a maximum amount of information on a minimum amount of paper, therefore a slow paper speed is required. In a different application, the same oscillograph may be required to provide more detailed information and to achieve this a higher paper speed is required. For these reasons it is desirable in quality oscillographs that a variety of paper speeds be available. This invention provides improved circuit arrangements for achieving an accurately controlled variable speed drive such as for use in moving paper through an oscillograph.

DESCRIPTION OF VIEW

The figure is a wiring diagram of an embodiment of the variable speed velocity servo circuit of this invention including the power supply.

DETAILED DESCRIPTION

As previously stated, this invention will be described as it partciularly relates to the application in an oscillograph to control the paper drive motor, it being understood that the invention is equally applicable to any other apparatus or device wherein selectable and accurate speed control is required.

Referring to the drawing, a paper drive motor is identified by the numeral 10 and it is the objective of the invention to provide means for accurately and selectively controlling the speed of the motor 10.

The power supply will first be described. A transformer 12 has a primary 14 which may be connected to a customarily available source of A.C. power, such as 110 volts A.C. The transformer secondary 16 is center tapped, at 18 which is connected to a common point or ground. The secondary 16 of the transformer 12 has taps to either side of the center tap 18 providing voltages indicated. The five volt taps are each connected to a diode 20 providing a —7 volts at conductor 22 which extends to supply the reverse motor voltage as will be described subsequently. Capacitor 24 serves as a filter to the —7 v. D.C. reverse motor supply.

The twenty volt taps are each connected to a diode 26 providing full wave rectified voltage which is filtered by capacitor 28 and reduced by resistor 30 to provide a +12 v. D.C. amplifier voltage at conductor 32. Voltage stabilization is accomplished by a Zener diode 34 and resistor 36.

Also connected to the twenty volt taps are diodes 36 which provide a negative rectified voltage filtered by capacitor 38 and regulated by resistor 40 and Zener diode 42 to provide a —12 v. D.C. on conductor 44 which serves as the negative amplifier supply voltage.

Connected to conductor 32 is a resistor 46 which, in combination with the low temperature coefficient Zener diode 48 and resistor 50, provide at conductor 52 a regulated positive 9 v. D.C. reference voltage.

A novel feature of this invention is means of multiplying speed range of the motor 10 by means of selectably varying the forward motor supply voltage in an arrangement wherein the heat generated in the forward drive transistor is reduced. The transformer secondary 15 volt taps are connected by diodes 54 to provide a rectifier D.C. voltage across capacitor 56 which is imparted to conductor 58 which extends to supply voltage to the forward power amplifier. The transformer secondary thirty-five volt taps are connected to diodes 60 providing a rectified negative D.C. high voltage at conductor 62. A silicon controlled rectifier 64 is provided, having a cathode 64A, an anode 64B, and a gate 64C. Conductor 62 having high voltage rectified negative D.C. voltage thereon is connected to the cathode 64A. Anode 64B is connected to capitor 56 and conductor 58. Connected to the gate 64C is a resistor 66, diode 68, and in series therewith, a switch 70.

With switch 70 open the silicon controlled rectifier 64 is blocked and no current flows therethrough. This means that the voltage impressed across condenser 56 and thereby on conductor 58 is the rectified voltage from the fifteen volt taps providing approximately 20 v. D.C. on conductor 58. When switch 70 closed the rectified voltage from the thirty-five volt taps is conducted through the silicon controlled rectifier 64, impressing 50 v. D.C. onto capacitor 56 and thereby on conductor 58. More specifically, when switch 70 is closed current can flow through diode 68 and resistor 66 to the gate 64C of the silicon controlled rectifier. This allows the silicon controlled rectifier to conduct and capacitor 56 now charges to 50 v. D.C. When capacitor 56 is charged with 50 v. D.C. diodes 54 are reversed bias and non-conductive. The current flow through switch 70 is only a few milliamperes. Thus by means of switch 70 either a high or a low forward motor supply voltage is available at conductor 58, in an arrangement having the advantage that full power is switched, with a switch required to handle only a small current flow. This means that a low current switch 70 may be used and the conductors connected to it may be of small gauge wires.

Mechanically affixed to motor 10 and rotated by it is a tachometer 72 which provides a negative D.C. voltage output at conductor 74, which voltage is proportional to the speed of the motor rotation. Basically, the variable speed velocity servo circuit of this invention consists in a novel means of comparing the output voltage of tachometer 72 against a reference voltage to control an amplification system which in turn controls the voltage applied to motor 10. An important feature of the invention is the means wherein accurate speed control of the motor is obtained at all times and wherein reverse voltage is supplied to the motor to immediately retard the speed thereof when the speed control is shifted from a higher to a lower speed level. The servo circuit may be generally divided into two portions, that is, an operational amplifier portion, generally indicated by the numeral 76 and a power amplifier portion generally indicated by the numeral 78.

The operational amplifier portion includes an operational amplifier 80 which may be of the silicon modular type such as catalog number H6010 as manufactured by the Union Carbide Company. The operational amplifier includes a positive voltage supply conductor 82 by which +12 v. D.C. is supplied by conductor 32, and a negative power supply 84 by which −12 v. D.C. is supplied by conductor 44. The operational amplifier 80 has two inputs 86 and 88. Input 88, a non-inverting input, is grounded through resistor 90. Input 86 is an inverting input, that is, if a positive signal is present at input 86 a negative signal will appear at the amplifier output 92. Under normal operating conditions a very small positive voltage exists at the negative input 86. This is multiplied by the open looped D.C. voltage of the amplifier, typically over 100,000, and the output is routed by conductor 94 to the input of the power amplifier 78.

A feedback circuit consisting of resistor 96 in series with capacitor 98 shapes the frequency response of the servo circuit to attenuate high frequencies which may be present in tachometer noise as well as oscillatory transits in the tachometer and coupling to the motor. Capacitor 100, which is of relatively small value, provides negative feedback to prevent high frequency circuit oscillation. A silicon diode 102 is placed in parallel with the feedback capacitor 98 to increase the responsive speed of the system when the velocity of motor 10 is reduced or stopped. During normal operations capacitor 98 is charged to approximately −.6 v., the output side being negative with respect to the input side. When a lower positive voltage is applied to the amplified input voltage reference network, the operational amplifier suddenly produces a positive output voltage to operate the reverse drive transistors to be described subsequently. Capacitor 98 must reverse its charge polarity rapidly when this occurs. Diode 102 is then forward biased and capacitor 98 discharges through it. This condition continues only until the motor 10 stabilizes at the new lower speed.

The output of tachometer 72 on conductor 74 is fed to a switch 104 which is used to vary the motor speed in the higher speed range. Conductor 106 feeds the tachometer output through resistor 108 to the operational amplifier input 86. A low speed range control switch 110 selects a reference voltage by which the speed of motor 10 is selected in low speed ranges. The switches 104 and 110 may be in the form of potentiometers providing continuous variable speed or, as illustrated, by a step arrangement facilitating the use of push buttons or otherwise for selecting one of several predetermined speeds.

Calibration potentiometer 112A has in series therewith a potentiometer 112B, which, in turn, is paralleled with a switch 112C. Switch 112C, when closed, shorts potentiometer 112B reducing the input resistance from the reference circuit switch 110. When the potentiometers 112A and 112B are properly adjusted switch 112C allows a convenient means of doubling the speed of motor 10.

Two silicon diodes 114 and 116 parallel in reversed polarity arrangement are placed between the input 86 of operational amplifier 80 and ground. The diodes 114 and 116 help protect the transistors making up the operational amplifier 80 from damaging voltage transients. These diodes draw current only during switching transients or externally generated voltage spikes. During ordinary operation, the negative input is kept close to zero volts by the feedback characteristics of the amplifier. The forward conduction characteristics of semi-conductor diodes 114 and 116 is such that they do not conduct any significant currents until the impressed voltage reaches several tenths of a volt. Voltage spikes of either polarity will be conducted to ground by one of the other silicon diodes 114 and 116, that is, diode 114 conducts when a negative voltage spike appears at the input 86 and diode 116 conducts when a positive voltage spike appears at input 86.

The power amplifier portion 78 of the servo circuit consists of two separate two-stage D.C. amplifiers. The first portion, including transistors 118 and 120, functions as a forward drive D.C. amplifier circuit. The signal appearing at conductor 94, which is the input to the power amplifier 78, normally has a voltage thereon between −.6 v. D.C. and −.8 v. D.C. This negative voltage passes through resistor 122 into the emitter-base circuit of type PNP transistor 118. The collector voltage is a negative voltage approximately equal to the negative supply voltage on the emitter transistor 120. A small emitter-base current approximately 100 to 200 microamperes is sufficient to drive two amperes through the motor 10. The emitter-base current in transistor 118 is amplified by the D.C. current gain of the transistor to allow a larger current to flow through the emitter-base circuit of the NPN type transistor 120. This current is amplified by the D.C. current gain of the transistor 120 to a value large enough to drive a motor 110.

When the signal at 94 is of positive polarity, it is instead fed through resistor 126 to the base of an NPN type transistor 128 and from the emitter of transistor 128 through resistor 130 the amplified signal is fed to the base of a PNP type reverse drive power transistor 132.

When the motor speed is slightly higher than ideal, the tachometer will produce a higher negative voltage. The voltage summation at input 86 of operating amplifier 80 results in a reduction in the negative D.C. output voltage at 92. This reduced voltage causes a smaller current to flow through transistors 118 and 120. This reduced current flow will allow the motor to slow down to the desired speed. If a somewhat larger overspeed condition occurs, such as when switch 110 is changed from a higher to a lower speed position, the output of operating amplifier 80 changes from a negative output to a positive output. Transistor 128 then causes transistor 132 to conduct positive polarity power to the motor, that is, a reversing current is applied to the motor 10. At this time the forward drive transistors 118 and 120 are not conducting. When the overspeed condition is corrected, the amplifier output positive polarity will return to a negative polarity causing forward drive transistors 118 and 120 to conduct once more.

To protect the output transistors 120 from high voltage spikes generated by the inductive nature of the motor 10, Zener diode 134 is placed across the emitter-collector circuit. Zener diode 134 is non-conductive except during voltage spikes.

Diode 136 protects the reverse drive transistor 132 except when it is conducting during over-speed conditions. Fuse 138 protects transistor 132 and the power supply should transistor 120 short out.

To improve the temperature compensation of the servo circuit a temperature compensating network has been provided consisting of a thermistor 140 and a resistance network consisting of resistors 142, 144, 146 and a variable trim resistor 148. The low speed range is the only speed appreciably affected by temperature drifts. Potentiometer 112 is calibrated for accuracy of speed control at an intermediate speed. After the motor 10 has reached normal operating temperatures trim resistor 148 is adjusted for accurate speed at the lowest speed setting of switch 110. If the ambient temperature rises thermistor 140 decreases in resistance lowering the voltage applied to the trim voltage contact 150 of the operating amplifier 80. Terminal point 152 of the operational amplifier 80 is grounded. Resistors 140, 142, 144 and 146 are chosen to match the temperature characteristics of the particular brand of operational amplifier 80 used.

The speed selector switch 104 and 110 are illustrated as being of the type wherein any one of several preselected speeds may be chosen. With a low voltage applied on conductor 58 through the forward power amplifier transistor 120, separate speeds of motor 10 may be selected by means of switch 110.

At lower selected speeds full tachometer voltage is applied to resistor 108 in switching network 104 and the speed is controlled by switch 110. In higher speed operation full reference voltage is applied to the input at potentiometer 112B, and the speed is controlled by switch 104. This arrangement creates better speed accuracy.

The high-low power switch 70 is mechanically connected to speed selector-switch 110 so that it will close when the highest speeds are selected. This extra power is then available to be used by the forward drive transistor 120. The difference between the supply voltage and the voltage required to drive the motor appears across the drive transistor. This difference, multiplied by the current drawn by the motor, is the transistor dissipation in watts. The saving in transistor power dissipation is a significant accomplishment of the invention since if a high voltage was always present in the forward supply, the voltage on the transistor in low speed operation and its resultant power dissipation would tend to be destructive of the transistor.

The servo circuit of this invention provides an arrangement for accurately controlling the speed of a drive motor. The accuracy of control is very rapid so that inertial effects of the drive motor and any devices connected to it are counteracted in such a way that a speed selection change produces a rapid transition from one speed to another. The servo circuit functions to positively correct for both overspeed as well as underspeed conditions. By the unique arrangement of the power supply circuit the selectable speed ranges are doubled While the invention has been described with a certain degree of particularity it is manifest that many changes may be made in the details of construction of the invention and arrangement of components without departing from the spirit and scope of this disclosure. It is understood that this invention is not limited to the abstract herein nor the summary nor the specific embodiment in which the invention is illustrated but the invention as set forth in the appended claim or claims including the full range of equivalency to which each element thereof is entitled.

What is claimed is:
1. A variable speed velocity servo circuit comprising:
a direct current motor;
a tachometer driven by said motor producing a voltage output proportional to the motor speed;
an inverting D.C. operational amplifier having a signal input, an output, and a voltage input point;
a D.C. power amplifier having a signal input, an output and a power input point, the output of said power amplifier being connected to said motor, the output of said operational amplifier being connected to said power amplifier input;
a selectable voltage means providing a selectable reference voltage output, such selectable voltage means serving as a speed selector means, the reference voltage output being connected to said operational amplifier input and the output of said tachometer being connected to said operational amplifier input whereby the voltage applied to said operational amplifier input is a function of the combined selected reference voltage and the tachometer output voltage;
a negative feedback circuit from said operational amplifier output to said operational amplifier input; and
wherein said D.C. power amplifier includes a reverse drive amplifier means and a forward drive amplifier means, each of said amplifier means being fed by said operational amplifier output, said forward and reverse amplifier means being connected in parallel providing a voltage output therebetween, said voltage output being applied to said motor whereby when said selectable voltage means is changed to reduce the speed of said motor from a higher to a slower speed reverse voltage is applied to said motor to effect substantially instantaneous speed change.

2. A variable speed velocity servo circuit comprising:
a direct current motor;
a tachometer driven by said motor producing a voltage output proportional to the motor speed;
an inverting D.C. operational amplifier having a signal input, an output, and a voltage input point;
a D.C. power amplifier having a signal input, an output and a power input point, the output of said power amplifier being connected to said motor, the output of said operational amplifier being connected to said power amplifier input;
a selectable voltage means providing a selectable reference voltage output, such selectable voltage means serving as a speed selector means, the reference voltage output being connected to said operational amplifier input and the output of said tachometer being connected to said operational amplifier input whereby the voltage applied to said operational amplifier input is a function of the combined selected reference voltage and the tachometer output voltage;
a negative feedback circuit from said operational amplifier output to said operational amplifier input; and
wherein said operational amplifier includes a trim voltage contact and including a variable trim voltage circuit applying trim voltage to said trim voltage contact and including a thermistor means in said trim voltage circuit whereby the amplification of said operational amplifier is varied to compensate for changes in temperature whereby the speed of said motor is maintained substantially constant regardless of temperature changes.

References Cited
UNITED STATES PATENTS

| | | | |
|---|---|---|---|
| 3,090,901 | 5/1963 | Shaw | 318—302 X |
| 3,154,730 | 10/1964 | Houldin | 318—302 |
| 3,250,975 | 5/1966 | Pepper | 318—328 X |
| 3,257,596 | 6/1966 | Wilkins | 318—327 |
| 3,375,425 | 3/1968 | Bell | 318—302 |

ORIS L. RADER, Primary Examiner

T. LANGER, Assistant Examiner

U.S. Cl. X.R.

318—373